United States Patent
Muthuswamy et al.

(10) Patent No.: US 12,299,013 B2
(45) Date of Patent: May 13, 2025

(54) PREDICTING OUTLIER DATA FROM NETWORK OF ELECTRONIC DATA

(71) Applicant: International Business Machines Corporation, Armonk, NY (US)

(72) Inventors: Srinivasan S. Muthuswamy, Bangalore (IN); Vrunda Ravindra Negandhi, Pune (IN); Sarbajit K. Rakshit, Kolkata (IN); Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 18/142,282

(22) Filed: May 2, 2023

(65) Prior Publication Data
US 2024/0370470 A1 Nov. 7, 2024

(51) Int. Cl.
| | |
|---|---|
| G06F 16/00 | (2019.01) |
| G06F 16/31 | (2019.01) |
| G06F 16/35 | (2019.01) |
| G06F 40/284 | (2020.01) |

(52) U.S. Cl.
CPC ............ *G06F 16/313* (2019.01); *G06F 16/35* (2019.01); *G06F 40/284* (2020.01)

(58) Field of Classification Search
None
See application file for complete search history.

(56) References Cited

U.S. PATENT DOCUMENTS

| | | | |
|---|---|---|---|
| 8,255,347 B2 | 8/2012 | Ellingsworth | |
| 9,483,554 B2 | 11/2016 | Drennan, III | |
| 11,748,566 B1* | 9/2023 | Lam | G06F 40/284 |
| | | | 704/9 |
| 2014/0058763 A1 | 2/2014 | Zizzamia et al. | |
| 2016/0379309 A1* | 12/2016 | Shikhare | G06Q 40/08 |
| | | | 705/4 |
| 2020/0394364 A1* | 12/2020 | Venkateshwaran | G06F 40/117 |

(Continued)

OTHER PUBLICATIONS

Assi, K., et al., "Predicting Crash Injury Severity with Machine Learning Algorithm Synergized with Clustering Technique: A Promising Protocol", International Journal of Environmental Research and Public Health, Jul. 30, 2020, 17 pages.

(Continued)

*Primary Examiner* — Anhtai V Tran
(74) *Attorney, Agent, or Firm* — Scully, Scott, Murphy & Presser, P.C.

(57) ABSTRACT

A computer-implemented method, computer program product, and/or computing system for determining unexpected data includes: running for a given claim a machine learning term prediction model with first and second term types to predict third type terms in a specific domain that uses a machine learning term embedding model that has learned the correlation between term types in the specific domain; determining cohesiveness between the predicted third type terms and the actual third type terms from the given claim; determining a value score between the predicted third type terms and the actual third type; and running a machine learning propensity model using the value score determined for the given claim and context data for the given claim to determine if the given claim is unexpected.

20 Claims, 10 Drawing Sheets

(56) References Cited

U.S. PATENT DOCUMENTS

2022/0044256 A1\* 2/2022 Lakshminarayanan ..................... G06N 3/045

OTHER PUBLICATIONS

Bach, M. P., et al., "Self-Organizing Maps for Fraud Profiling in Leasing", 2018 41st International Convention on Information and Communication Technology, Electronics and Microelectronics (MIPRO), Date of Conference: May 21-25, 2018, 6 pages.

Bockhorst, J., et al., "Knowledge Graph-Driven Conversational Agents", 33rd Conference on Neural Information Processing Systems (NeurIPS 2019), Vancouver, Canada, 12 pages.

Brockett, P. L., et al., "Using Kohonen's Self-Organizing Feature Map to Uncover Automobile Bodily Injury Claims Fraud", The Journal of Risk and Insurance, 1998, pp. 245-274, vol. 65, No. 2.

Hassan, A. K. I., et al., "Computational Intelligence Models for Insurance Fraud Detection: A Review of a Decade of Research", Journal of Network and Innovative Computing ISSN 2160-2174, 2013, pp. 341-347, vol. 1.

Dimri, A., et al., "Enhancing Claims Handling Processes with Insurance Based Language Models", 2019 18th IEEE International Conference On Machine Learning And Applications (ICMLA). IEEE, 2019, 3 pages, Abstract only.

Moon, H., et al., "A Predictive Modeling for Detecting Fraudulent Automobile Insurance Claims", Theoretical Economics Letters, Aug. 2019, 15 pages.

Krishnaveni, S., et al., "A Perspective Analysis of Traffic Accident using Data Mining Techniques", International Journal o{Computer Applications, Jun. 2011, pp. 40-48, A(0975-8887), vol. 23, No. 7.

Popowich, F., "Using Text Mining and Natural Language Processing for Health Care Claims Processing", ACM SIGKDD Explorations Newsletter 7.1, 2005, pp. 59-66.

Verma, R., et al., "Using Analytics for Insurance Fraud Detection", FINsights Journal, Infosys 10, 2015), pp. 1-23.

\* cited by examiner

PREDICTING OUTLIER DATA FROM NETWORK OF ELECTRONIC DATA

BACKGROUND

The present application relates generally to information handling and/or electronic data processing and analytics, and more particularly to automated or machine learning techniques to determine or predict non-corresponding or outlier electronic data using term patterns between term types.

With the advancement of information technology and wide use of storing and processing electronic data, more and more data is available to provide more accurate but time-consuming analysis and correlations. The raw data can be large and scattered across locations and may be difficult to read, process and understand and develop correlations between the data. Reviewing such large volumes of disparate information, determining outlier or unexpected data and generating reports on the outlier data would be time-consuming, may require repetitive and manual work, and would be difficult to obtain meaningful and timely result. It would be advantageous to have a system and techniques to process electronic data in an efficient manner to determine outlier or unexpected data where correspondence between the predicted data as represented by a term type (e.g., a predicted claim) and the actual data represented by the term type (e.g., the actual claim) is not what is expected and generate a report.

SUMMARY

The summary of the disclosure is given to aid understanding of systems, platforms, tools, computer program products and/or techniques of predicting terms in computing environments and more specifically in one or more embodiments determining or predicting outlier data (e.g., claims) that does not indicate a proper or expected correspondence with other data and terms using term patterns between term types, and not with an intent to limit the disclosure or the invention.

A system, platform, programming product, and computer implemented method are disclosed for determining whether data is unexpected or outlier data, using for example term patterns in an embodiment between term types. The system, platform, programming product, and/or method includes building and training a machine learning term embedding model for a specific domain to learn the correlation between at least a first term type, a second term type and a third claim type using historical data from the specific domain. The system, platform, programming product, and/or method can further include building and training a machine learning term prediction model using the term embedding model and historical data to predict terms used in claims in the specific domain. First type (e.g., incident) terms, second type (e.g., vehicle damage) terms, and third type (e.g., injury) terms in an approach can be extracted for a given claim in the specific domain. The term prediction model in an embodiment can be run with the first term types and the second term types extracted from the given claim in the specific domain to obtain predicted third type terms for the given claim.

In one or more embodiments, the system, platform, programming product, and/or method can include determining cohesiveness between the predicted third type terms and the third type terms extracted from the given claim in the specific domain. In a further approach, a value score between the predicted third type terms and the third type terms extracted from the given claim in the specific domain can be determined. In a further aspect, the system, platform, programming product, and/or method can include building and training a machine learning propensity model using the value score and context data from historical corpus of claims to predict the likelihood that the third type terms are unexpected; and running the propensity model with the value score determined for the given claim and context data for the given claim to determine if the given claim is unexpected. The system, platform, programming product, and/or method includes in an embodiment extracting at least one of an extraction group consisting of lexicons, key words, and combinations thereof from unstructured and structured data from documents in the specific domain to build and train the term embedding model. Natural Language Processing can be used to extract at least one of the extraction group.

In an aspect, determining the cohesiveness between the predicted third type terms extracted from the given claim comprises using at least one of a measurement group consisting of clustering techniques, distance in a term vector space, and combinations thereof. In a further embodiment, determining the cohesiveness between the predicted third type terms extracted from the given claim comprises predicting other third type terms from a subset of third type terms. The system, platform, programming product, and/or method can in an arrangement further include determining a cohesiveness score between the predicted third type terms and the third type terms extracted from the given claim, and can also include in an aspect determining value score between the predicted third type terms and the third type terms extracted from the given claim comprises using the cohesiveness score and the output from the term prediction model. In one or more embodiment the system, platform, programming product, and/or method the specific domain is vehicle accidents, the first term type are terms descriptive of the vehicle accident, the second term type are terms descriptive of the vehicle damage, and the third term type are terms descriptive of the injury, and the system, platform, programming product, and/or method can be used to determine an erroneous or unexpected injury claim that may be indicative of fraud. The system, platform, programming product, and/or method can according to an embodiment include identifying unexpected portions of the given claim, and in a further aspect can include scoring the given claim.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of methods, techniques, computer program products, platforms, tools, and/or systems for determining or predicting outlier data or claims using term or word patterns and correlations between term types, will be better understood when read in conjunction with the figures provided.

Embodiments are provided in the figures for the purpose of illustrating aspects, features, and/or various embodiments of the methods, techniques, products, computer program products, platforms, tools and/or systems for determining or predicting outlier data or claims using term or word patterns and correlations between term types, but the claims should not be limited to the precise arrangement, structures, features, aspects, assemblies, subassemblies, systems, platforms, circuitry, functional units, programming, instructions, code, embodiments, methods, processes, or devices shown.

DETAILED DESCRIPTION

Figure 1:
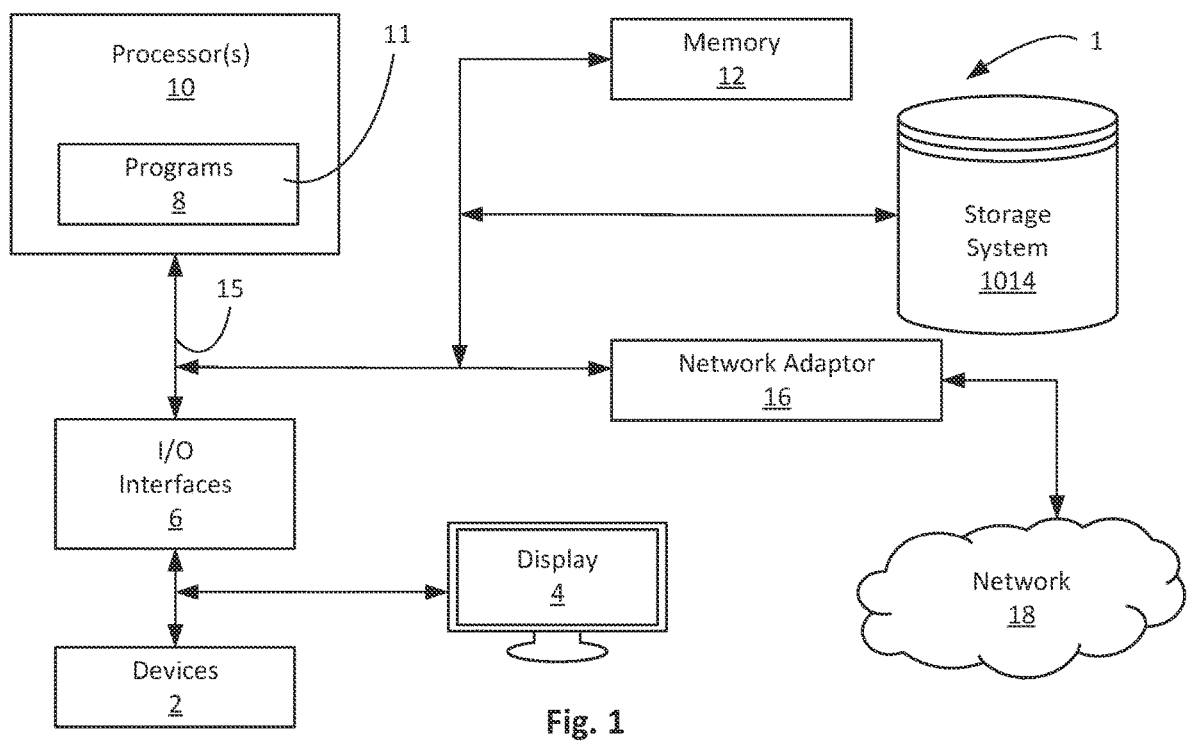
FIG. 1 is an overview block diagram of an exemplary computing environment on which the present disclosure of determining outlier data using term or word patterns can be practiced according to an embodiment.

The following description is directed to a person of ordinary skill in the art, is made for illustrating the general principles of the invention, and is not meant to limit the inventive concepts claimed herein. In the following detailed description, numerous details are set forth in one or more embodiments in order to provide an understanding of methods, techniques, computer program products, platforms, tools, and systems for determining or predicting outlier data using term patterns between term types, however, it will be understood by those skilled in the art that different and numerous embodiments of the methods, techniques, computer program products, platforms, tools, and/or systems may be practiced without those specific details, and the claims and disclosure should not be limited to the arrangements, embodiments, features, aspects, systems, assemblies, subassemblies, structures, functional units, circuitry, programming, instructions, code, processes, methods, or details specifically described and shown herein.

In addition, features described herein can be used separately or in combination with other described features in each of the various possible combinations and permutations. Accordingly, variations and modifications may be made to the systems, platforms, tools, computer program products, techniques, and/or methods for determining or predicting outlier data or claims using term patterns between different term types to achieve different effects. It may be noted that a numbered element in the figures is typically numbered according to the figure in which the element is introduced, is typically referred to by that number throughout succeeding figures, and that like reference numbers generally represent like parts of exemplary embodiments of the invention.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a", "an" and "the" include plural referents unless otherwise specified, and that the terms "includes", "comprises", and/or "comprising." when used in this specification, specify the presence of stated features, integers, steps, operations, elements, and/or components, but do not preclude the presence or addition of one or more other features, integers, steps, operations, elements, components, and/or groups thereof.

As the disclosure is directed to an improvement in computing technology, the description will start with a discussion of one or more computing environments where the disclosure would be applicable. It should be appreciated that the disclosed computing environments are only examples, and that the disclosure should not be limited to the specific computing environments disclosed. Furthermore, the following discussion omits or only briefly describes the computing environment, including the distributive computing environment, for example cloud computing environment which are apparent to those skilled in the art. It is assumed that those skilled in the art are familiar with computing environments including distributive computing environments, for example cloud computing and that those of skill in the art are also familiar with artificial intelligence (AI), machine learning (ML) models, cognitive analytics, and their application in accessing or analyzing data and relationship networks.

FIG. 1 illustrates an example computing environment 1 including for example a computing device and/or electronic data processing system 1 in which aspects of the present disclosure may be practiced. It is to be understood that the computing environment 1 depicted is only one example of a suitable computing and/or processing system and is not intended to suggest any limitation as to the scope of use or functionality of embodiments of the present invention. For example, the system shown may be operational with numerous other special-purpose computing system environments or configurations. Examples of well-known computing devices, systems, platforms, environments, and/or configurations that may be suitable for use in the present disclosure may include, but are not limited to, server computer systems, mainframe computers, distributed cloud computer systems, personal computer (PC) systems, PC networks, thin clients, thick clients, minicomputer systems, handheld or laptop devices, multiprocessor systems, microprocessor-based systems, smart phone, set top boxes, programmable consumer electronics, and the like that include or can access any of the above systems or devices, and the like.

In some embodiments, the computing environment (e.g., computing device and/or system) 1 may be described in the general context of computer executable instructions, embodied as programs or program modules 8 (e.g., computer program product) stored in memory 12, being executed by the computer system. Generally, program modules may include routines, programs, objects, components, logic, data structures, and so on that perform particular tasks and/or implement particular input data and/or data types in accordance with the present invention.

The components of the computer environment 1 may include, but are not limited to, one or more processors or processing units 10, a memory 12, and a bus 15 that operably couples various system components, including memory 12 to processor 10. In some embodiments, the processor 10, which is also referred to as a central processing unit (CPU) or microprocessor, may execute one or more programs or modules 8 that are loaded from memory 12 to local memory 11, where the program module(s) embody software (program instructions) that cause the processor to perform one or more operations. In some embodiments, module 8 may be programmed into the integrated circuits of the processor 10, or loaded from memory 12, storage device 14, network 18 to local memory 11, and/or combinations thereof.

The processor (or CPU) 10 can include various functional units, registers, buffers, execution units, caches, memories, and other units formed by integrated circuitry, and may operate according to reduced instruction set computing ("RISC") techniques. The processor 10 processes data according to processor cycles, synchronized, in some aspects, to an internal clock (not shown). Bus 15 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer device and/or system 1 may include a variety of computer system readable media, including non-transitory readable media. Such media may be any available media that is accessible by the computer system, and it may include both volatile and non-volatile media, removable and non-removable media.

Memory 12 (sometimes referred to as system or main memory) can include computer readable media in the form of volatile memory, such as random-access memory (RAM), cache memory and/or other forms, including non-volatile memory. Computing environment 1 can further include other removable/non-removable, volatile/non-volatile computer system storage media. By way of example only, storage system 14 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 15 by one or more data media interfaces.

The computer environment 1 may also communicate with one or more external devices 2 such as a keyboard, track ball, mouse, microphone, speaker, a pointing device, etc.; one or more devices that enable a user to interact with the computer system; any devices (e.g., network card, modem, etc.) that enable the computer system to communicate with one or more other computing devices, and/or one or more displays 4 that present information to a user. Such communication can occur via Input/Output (I/O) interfaces 6. Communications or network adapter 16 interconnects bus 15 with an outside network 18 enabling the computing environment 1 to communicate with other such systems. Additionally, an operating system such as, for example, AIX ("AIX" is a trademark of the IBM Corporation) can be used to coordinate the functions of the various components shown in FIG. 1.

The computing environment 1 can communicate with one or more networks 18 such as a local area network (LAN), a general wide area network (WAN), and/or a public network (e.g., the Internet) via network adapter 16. As depicted, network adapter 16 communicates with the other components of computing environment via bus 15. It should be understood that although not shown, other hardware and/or software components could be used in conjunction with the computing environment. Examples include, but are not limited to: microcode, device drivers, redundant processing units, external disk-drive arrays, RAID systems, tape drives, and data archival storage systems, etc.

Figure 2:
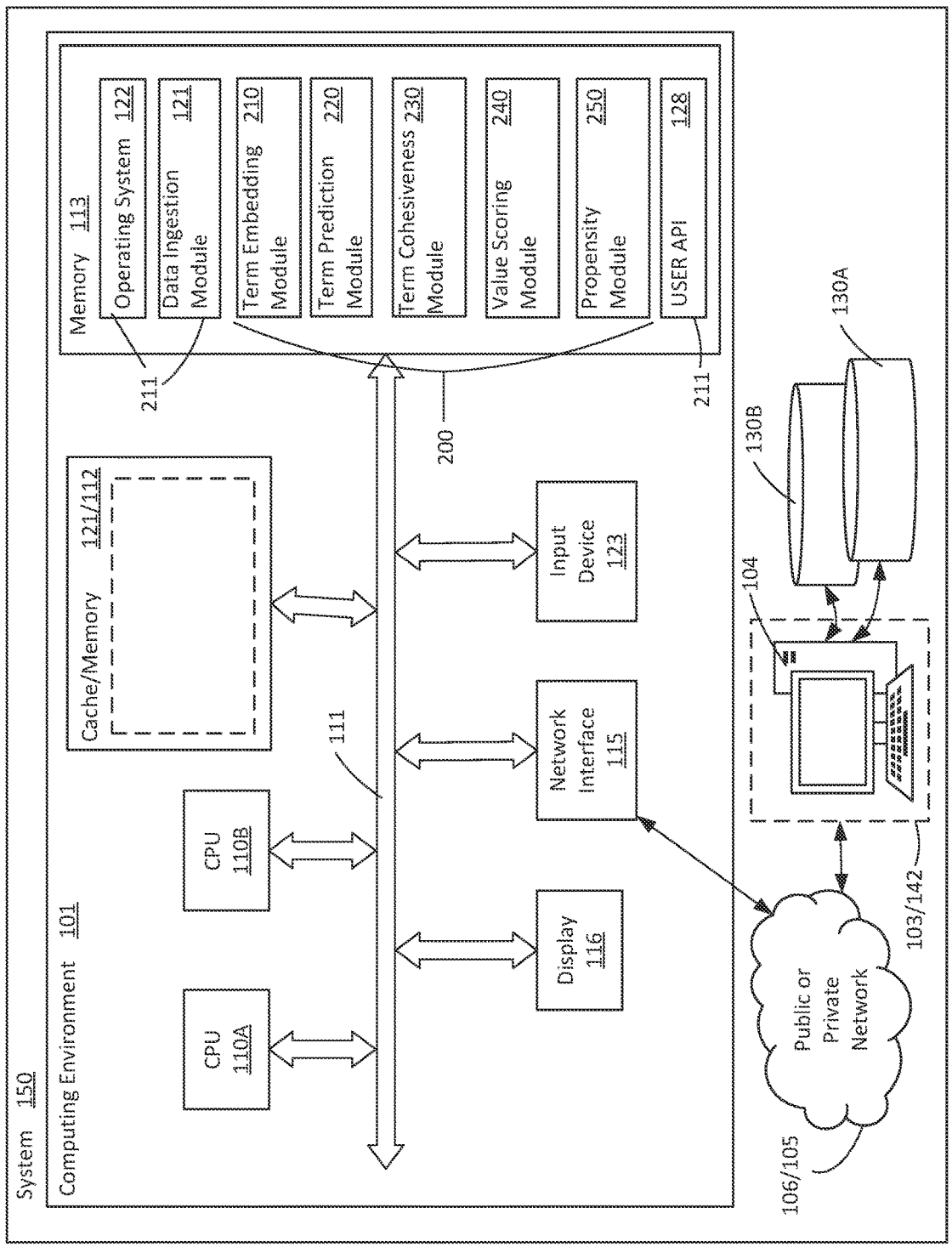
FIG. 2 is an overview block diagram of an exemplary computing environment to implement the present disclosure of determining outlier data using term patterns according to an embodiment of the present disclosure.

FIG. 2 illustrates a system 150, including a computing environment 101, configured and programmed to determine outlier data using data patterns and correlations between term types that includes according to an embodiment building and training a specific domain embedding model, building and training a term prediction model, obtaining predicted terms for a given claim, determining similarity or cohesiveness between actual claim terms and predicted claim terms for the given claim, building and training a propensity model and running the propensity model with actual claim data, including in an embodiment claim context data, to determine outlier claim. According to an embodiment, computing environment 101 can be referred to as a master node 101, and master node can be part of a computing environment, including a computing system 150, that includes one or more worker nodes or end user devices 103/142. In one or more aspects, computing environment 101 can include, for example, mainframe computers, servers, distributed or cloud computing environments, thin clients, thick clients, personal computers, PC networks, laptops, tablets, mini-computers, multiprocessor-based systems, microprocessor-based systems, smart devices, smart phones, set-top boxes, programmable electronics, or any other similar computing device.

Computing environment 101 can include a cloud-based server, and can include one or more hardware processors 110A, 110B (also referred to as central processing units (CPUs)), a memory 113, e.g., for storing an operating system, application program interfaces (APIs) and programs, a network interface 115, a display device 116, an input device 123, and any other features common to a computing device, including a server. Further, as part of platform 101, there is provided a local cache/memory 121/112 and/or an attached memory storage device (not shown).

In one or more aspects, platform 101 may, for example, be any computing environment or device, including one or more web-based or cloud-based computing devices that are configured to communicate over a public or private communications network 105/106 with one or more user devices 103 (e.g., worker nodes 103). For instance, client user devices 103 can communicate with computing environment 101 where client user devices can include processing resources and memory (e.g., remote server) 104 that includes databases 130A and 130B.

In the embodiment depicted in FIG. 2 processors 110A. 110B may include, for example, a microcontroller, Field Programmable Gate Array (FPGA), or any other processor that is configurable to perform operations according to instructions in software programs as described below. These instructions may be stored, for example, as programmed modules 211 in memory storage 113. Communication channels 111, e.g., wired connections such as data bus lines, address bus lines, Input/Output (I/O) data lines, video bus, expansion busses, etc., are shown for routing signals between the various components of computing environment 101.

Network interface 115 is configured to transmit and receive data or information to and from computing environment 101, e.g., via wired or wireless connections. For example, network interface 115 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 103/142 to transmit information to or receive information from computing environment 101.

Display 116 may include, for example, a computer monitor, television, smart television, a display screen integrated into a personal computing device such as, for example, laptops, smart phones, smart watches, virtual reality headsets, smart wearable devices, or any other mechanism for displaying information to a user. In one or more aspects, display 116 may include a liquid crystal display (LCD), an e-paper/e-ink display, an organic LED (OLED) display, or other similar display technologies. In one or more aspects, display 116 may be touch-sensitive and may also function as an input device. Input device 123 may include, for example, a keyboard, a mouse, a touch-sensitive display, a keypad, a microphone, a camera, or other similar input devices or any other input devices that may be used alone or together to provide a user with the capability to interact with the computing environment 101.

Memory 113 may include, for example, removable/non-removable, volatile/non-volatile storage media. Memory 113 may include, for example, non-transitory computer readable media in the form of volatile memory, such as random-access memory (RAM), non-volatile memory, cache memory and/or other memory. By way of non-limiting examples only, memory 113 may include a hard disk, a read-only memory (ROM), an erasable programmable read-only memory (EPROM or Flash memory), a compact disc read-only memory (CD-ROM), an optical storage device, a magnetic storage device, a portable computer diskette, a random-access memory (RAM), or any suitable combination of the foregoing.

Memory 113 of computing environment 101 stores one or more modules 211 that include, for example, programmed instructions adapted to determine outlier data using term patterns and/or correlations between term types, including in an example embodiment predicting the probability of an outlier claim using term patterns. In one embodiment, one of the programmed processing modules stored in memory 113 includes a data ingestion module 121 that provides instructions for employing logic and operating circuitry to access/read large amounts of data for use by other modules 211 that process and/or analyze the electronic data.

In one or more embodiments, computing system 150, including computing environment 101, e.g., memory 113, contains outlier prediction Module 200, which contains modules 211 for analyzing data and determining outlier data using term patterns as discussed in detail herein. In an example embodiment outlier prediction module 200 contains a Term Embedding Module 210, a Term Prediction Module 220, a Term Cohesiveness Module 230, a Value Scoring Module 240, and a Propensity Module 250. The Term Embedding Module 210, the Term Prediction Module 220, the Term Cohesiveness Module 230, the Value Scoring Module 240, and the Propensity Module 250 will be described in greater detail below. It can be appreciated that portions or various modules 211 of the Module 200 can be distributed throughout computing environment 101 and/or system 150. For example, the programs (e.g., software applications/instructions) for use by the Module 200 can be stored outside Module 200 and can be distributed throughout computing environment 101 (e.g., Master Node 101) or in locations within computing system 150. Similarly, the artificial intelligence (AI), machine learning (ML) models, and cognitive analytics utilized by the outlier prediction Module 200 can reside within outlier prediction Module 200, can be contained within one or more separate Machine Learning (ML) Modules, or be distributed throughout the System 150 and/or computing environment 101.

Computing environment 101 optionally includes a supervisory program having instructions to employ logic for configuring the processors 110, including the servers to call one or more, and in an embodiment all, of the program modules 211 and invoke the operations of system 150 and/or computing environment (master node) 101. In an embodiment, such supervisory program calls provide application program interfaces (APIs) for running the programs. At least one application program interface (API) 128 is invoked in an embodiment to perform data analytics including determining the viability and correctness of a claim using term patterns according to the one or more embodiments disclosed herein, including in an embodiment using correlations between term types.

The system, computing environment, platform, tool, computer program product, method and/or techniques disclosed herein in one or more embodiments employ cognitive systems, machine learning, and/or artificial intelligence programming and logic. As an overview, a cognitive system is a specialized computer system, or set of computer systems, configured with hardware and/or software logic (in combination with hardware logic upon which the software executes) to perform electronic data analytics and has the ability to emulate human cognitive functions. These cognitive systems apply, convey and manipulate electronic data at various levels of interpretation which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

Navigate the complexities of human language and understanding

Ingest and process vast amounts of structured and unstructured electronic data

Generate and evaluate hypotheses

Weigh and evaluate responses that are based only on relevant evidence

Provide situation-specific advice, insights, and guidance

Improve knowledge and learn with each iteration and interaction through machine learning (ML) models and processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

Provide a high degree of relevant recollection (memorization and recall) from data points (images, text, voice)

Predict and sense with situation awareness that mimics human cognition based on experiences Answer questions based on natural language and specific evidence.

Figure 3:
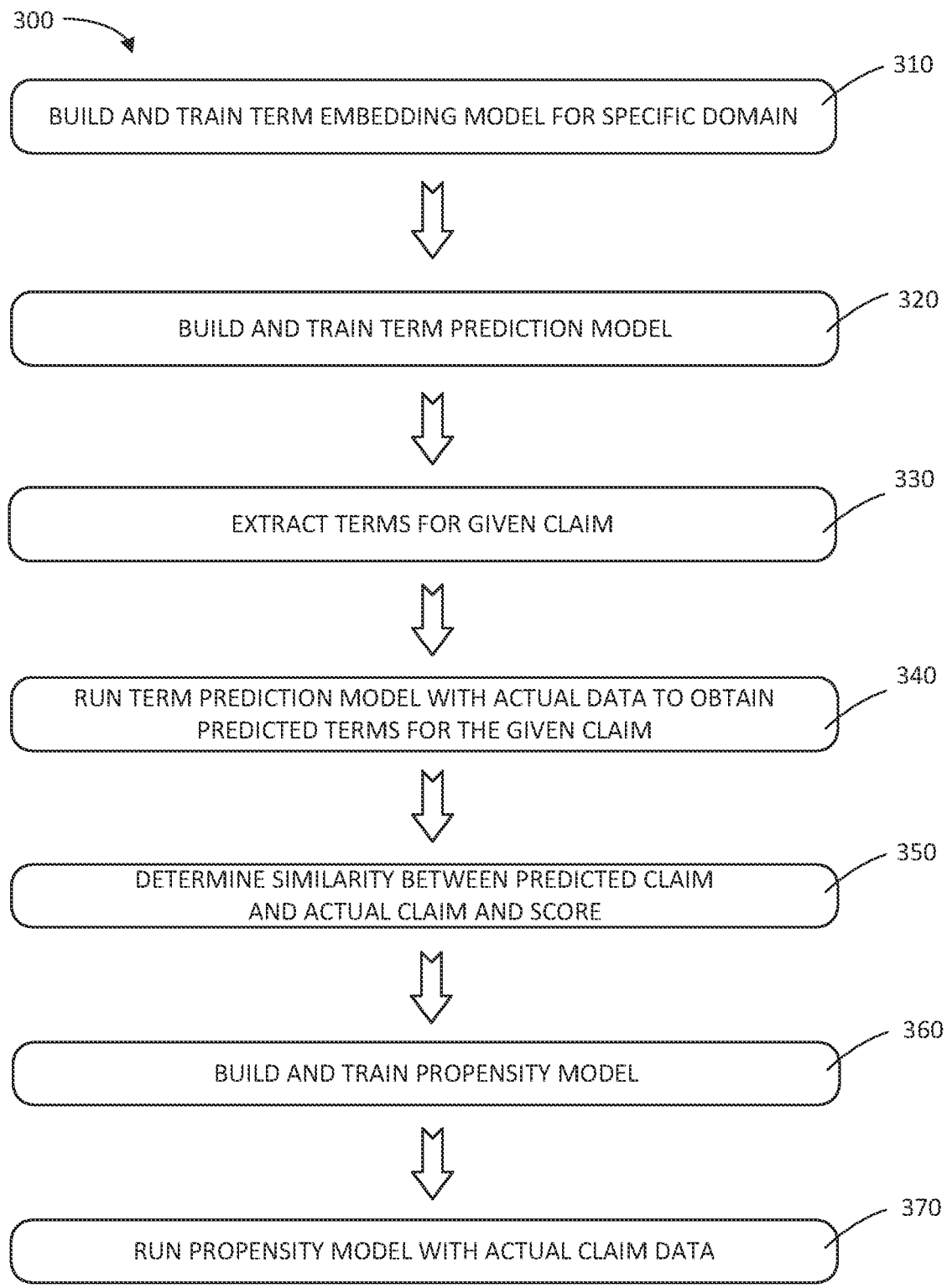
FIG. 3 is a flow chart showing an overview process of determining outlier data using term patterns according to an embodiment of the present disclosure.

FIG. 3 outlines an exemplary flowchart in accordance with an embodiment illustrating and describing an overview method 300 of determining or predicting whether there is outlier data using term patterns and in an embodiment the correlation between term types. In an example embodiment, for purposes of illustration, the method 300 can be used for predicting the propensity of an erroneous or outlier claim by using term patterns as derived from various reports for a vehicle accident injury claim. While method 300 will be described in connection with a vehicle accident, it can be appreciated that the method 300 and techniques described herein can be applied to other domains, for example, worker compensation claims. In addition, while the method 300 is described for the sake of convenience and not with an intent of limiting the disclosure as comprising a series and/or a number of steps, it is to be understood that the process 300 does not need to be performed as a series of steps and/or the steps do not need to be performed in the order shown and described with respect to FIG. 3 but the process 300 can be integrated and/or one or more steps can be performed together, simultaneously, or the steps can be performed in the order disclosed or in an alternative order.

At 310 a term embedding model 215 is a machine learning (ML) model that is built or created and trained for a specific domain. The term embedding model 215 looks at historical data from a specific domain to obtain, discover, and learn a correlation between different types of terms. The term embedding model 215 is a technique that can be applied to a respective domain and trained to understand the semantics in that respective domain, and more particularly in an embodiment the correlation between different term types, e.g., first term types, second term types, and third term types. The term embedding model 215 employs Natural Language Processing (NLP) where the terms or words are represented in vector space and inter-word semantics are maintained where if the distance between two words/terms are close, then the words are likely related (e.g., there is a correlation between the words). Building and training the term embedding model at 310 includes using historical data and understanding the connection between the nature of the incident (e.g., the vehicle accident) and the result (e.g., the claim or injury) by a machine learning (ML) process.

For example, in the specific domain of claims (e.g., injury claims) from vehicle accidents, historical data is processed and analyzed to obtain and discover a correlation between a first type of terms (e.g., "incident" or "accident" terms), a second type of terms (e.g., "vehicle damage" terms) and a third type of terms (e.g., "injury" terms). The term embedding model 215 is trained with the accident narrative, the vehicle damage narrative, and the body injury narrative from historical vehicle accident claims and the term embedding model 215 is fine-tuned so that it understands and captures the semantics between the accident description, the vehicle damage description, and the body injury description from each vehicle accident claim. The term embedding model learns the correlation or relationship between the first term (incident) type, the second term (vehicle damage) type, and the third term (injury) type.

Figure 4:
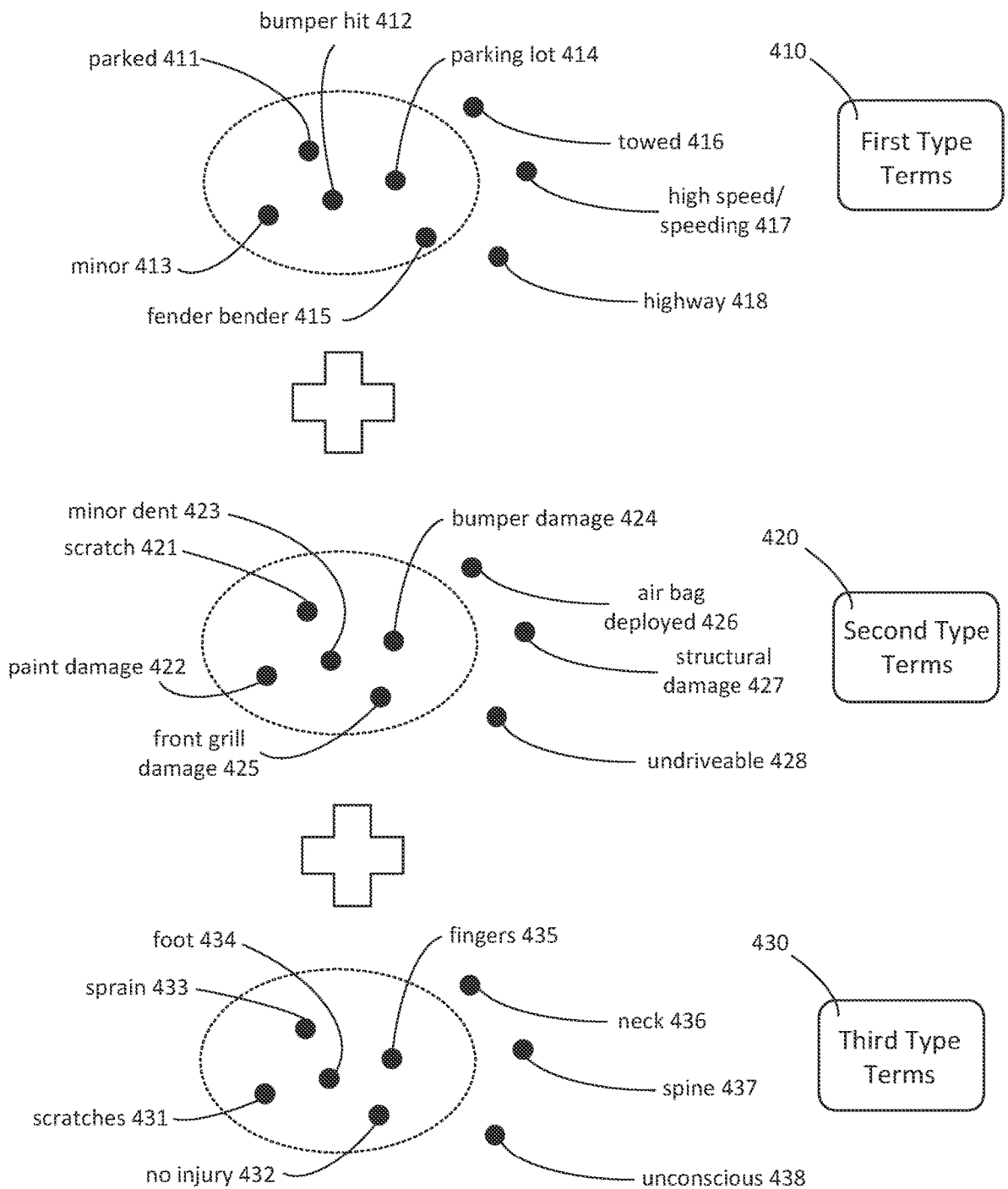
FIG. 4 shows an example diagrammatic representation of building and training an embedding model to obtain a correlation between term types according to an embodiment of the present disclosure.

FIG. 4 is a diagrammatic illustration of an example of building and training the term embedding model 215 in the domain of vehicle accident claims. As shown in FIG. 4 there are first type of terms (First Type Terms 410) which in this example are incident or accident terms that describe the nature of the incident or accident. In this regard, the terms "parked" 411, "bumper hit" 412, "minor" 413, "parking lot" 414 and "fender bender" 415 are within a certain distance in the term or word vector space and are correlated as they all relate to a relatively minor accident, while the terms "towed" 416, "high speed" or "speeding" 417 and "highway" 418 are not correlated with the terms indicative of a minor accident.

The Second Type Terms 420 in the example of FIG. 4 in the vehicle accident claim domain are vehicle damage terms that describe the nature of the damage to the vehicles. In this regard, the terms "scratch" 421, "paint damage" 422, "minor dent" 423, "bumper damage" 424, and "front grill damage" 425 are within a certain distance in the term vector space and are correlated as they all relate to a relatively minor accident and minor vehicle damage, while the terms "air bag deployed" 426, "structural damage" 427 and "undriveable" 428 are not correlated with the terms indicative of minor vehicle damage. The Third Type Terms 430 in the example of FIG. 4 in the vehicle accident claim domain are injury terms that describe the nature of the injury to people involved in the vehicle accident. In this regard, the terms "scratches" 431, "no injury" 432, "sprain" 433, "foot" 434, and "fingers" 435 are within a certain distance in the term vector space and are correlated as they all relate to a relatively minor injuries, while the terms "neck" 436, "spine" 437 and "unconscious" 438 are not correlated with the terms indicative of minor injuries. It should be pointed out the terms and spacing illustrated in FIG. 4 are only for illustration purposes and do not represent the actual relationship and the spacing between the respective terms in the term vector space.

Figure 5:
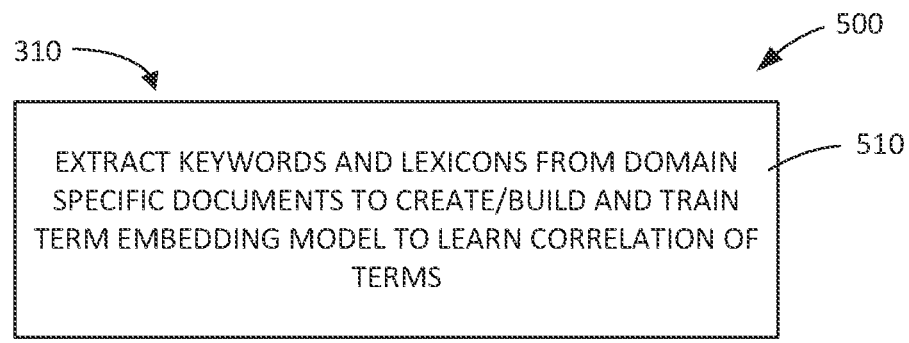
FIG. 5 is a flow chart of an embodiment of a process of building and training a specific domain embedding model to learn a correlation between different term types according to the present disclosure.

FIG. 5 is a flow chart of a method 500 according to an embodiment and includes at 510 extracting keywords and lexicons from domain specific documents to create, build, and train the term embedding model at 310 to learn the correlation of terms in the specific domain. For example, in the domain of vehicle accident claims the system extracts the keywords from the accident narrative, the vehicle damage narrative, the injury narrative. In an embodiment, natural language processing (NLP) is used to extract the lexicons and key terms or words and use them as features to train the term embedding model 215 in such a manner that correlated accident terms, vehicle damage terms, and bodily injury terms are likely to be closer in the term vector space based upon their similarity. The terms that are likely to appear together in the claim corpus will have less distance in the term vector space than terms that are not likely to appear together. From the historical claim corpus, the accident, vehicle damage, and injury lexicons (key terms and words) are identified and used to create the word/term embedding model 215.

The historical data corpus for first type terms, the second type terms, and the third type terms will depend upon the specific domain. The information available will be both structured sources of information as well as unstructured sources of information. The process 300 in an embodiment will leverage unstructured information available about a claim. Natural Language Processing (NLP) can be used to gain insights from unstructured information. For example, in the vehicle accident domain, unstructured data can include claim forms, notes, police reports, auto body reports, and in circumstances hospital files and other medical records. Other domains will include other information, notes, and reports. That is, for example, the domain of worker injury claims would rely upon other notes, reports and information as would other domains.

Figure 6:
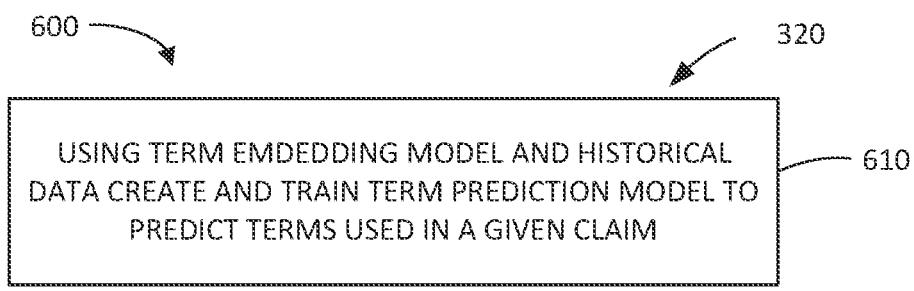
FIG. 6 is a flow chart of an embodiment of a method to build and train a terms prediction model to predict claim terms according to the present disclosure.

Turning back to FIG. 3 and method 300, at 320 a terms prediction model 225 is built and trained. At 320, a machine learning (ML) terms prediction model 225 uses and leverages the term embedding model 215 to learn to predict the third type terms from the first type terms and the second type terms. For example, in the vehicle accident domain, a machine learning (ML) terms predication model 225 is built and trained to predict the third type (injury) terms from the first type (incident or accident) terms and the second type (vehicle damage) terms. FIG. 6 provides a process 600, which is an embodiment of the process at 320, where at 610 using the term embedding model 215 created at 310 and historical data, a terms prediction model 225 is created and trained to predict third type terms for a claim.

The terms prediction machine learning (ML) model 225, using the term embedding model 215, learns what first type terms and second type terms in a specific domain correlate with what third type terms to predict the third type terms based upon the input of first and second type terms. For example, in the vehicle accident domain, for each claim in the historical data corpus, the incident or accident (first type) terms, the vehicle damage (second type) terms, and the injury (third type) terms are passed through the term embedding model 215 and creates word embedding from the domain specific term embedding model 215 (created at 310). The terms prediction machine learning model 225 learns from the term embedding model 215 what first type (incident) terms and second type (vehicle damage) terms correlate with what third type (injury) terms to predict the third type (injury) terms to expect from the specific first type incident) terms and second type (vehicle damage) terms.

Figure 7:
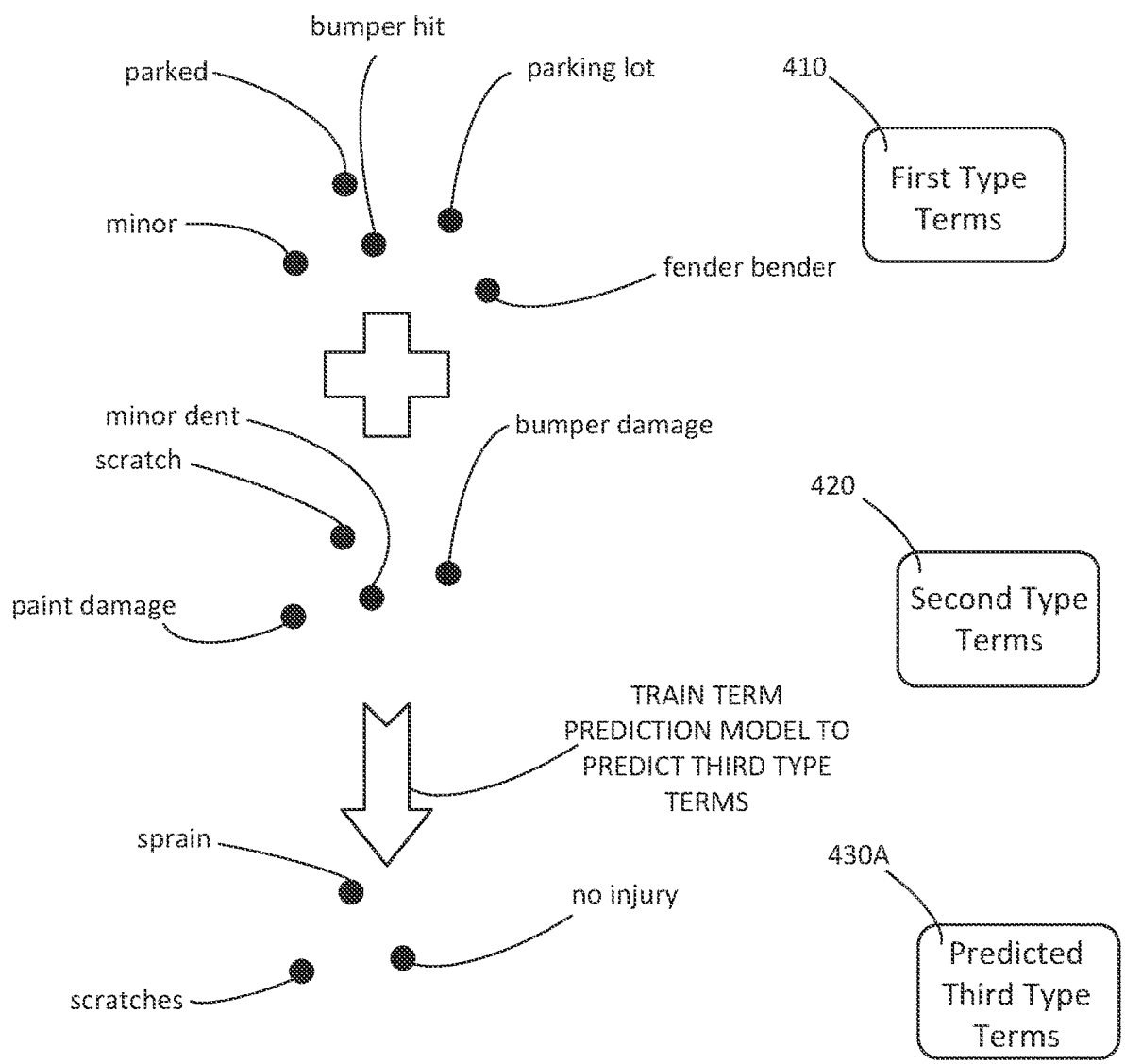
FIG. 7 shows an example diagrammatic representation of building and training the terms prediction model to predict terms for a given claim according to an embodiment of the present disclosure.

FIG. 7 diagrammatically illustrates building and training the terms prediction model 225 to predict the third type terms based upon the input of the first type terms and their respective second type terms. FIG. 7 illustrates an example of first type terms 410 and second type terms 420 for the vehicle accident domain where the term prediction model 225 is built and trained with historical data to learn to predict the third type terms 430. Each available claim in the historical data corpus for the specific domain at issue is used to pass through to create and train the term prediction model 225 so that the third terms can be predicted from the first term type and second term type.

At 330 the first type terms 410 and second type terms 420 are extracted for a given claim. In an embodiment, the third type terms 430 are also extracted at 330. In the example vehicle accident domain, the incident or accident terms 410, the vehicle damage terms 420, and the injury terms 430 are extracted from the various descriptive materials including from insurance forms, police reports, medial records (if appropriate and available), or other materials including notes. At 340 the term prediction model 225 is run with the narrative data (e.g., the first type (incident) terms and the second type (vehicle damage) terms) for the given claim to obtain the predicted third type of terms for the given claim. That is, for example in the vehicle accident domain, the term prediction model 225 is run at 340 with the incident (first type) terms 410 and the vehicle damage (second type) terms 420 extracted from the various claim materials (e.g., claim forms, notes, police reports, etc.) to obtain predicted injury (third type) terms 430A.

Process 300 continues to 350 where it is determined how similar or cohesive the actual third type terms 430 are to the predicted third type terms 430A. That is, process 300 at 350 in an embodiment determines how similar the third type (injury) terms 430 from the given claim are to the third type (injury) terms 430A predicted by the term prediction model 225 run at 340. As an example, set A is the list of predicted injury terms and set B is the list of injury terms in the actual claim, and the difference is determined between set A and set B where the difference between the two sets represents the odd term(s). As can be appreciated the actual third type terms 430 for the given claim can be extracted from the claim materials or narrative (e.g., the police report, notes, insurance claim forms, medical records, etc.), and those actual third type (injury) terms are compared to the third type (injury) terms 430A predicted by the term prediction model 225 and the similarity of the actual 430 and predicted third type terms 430A (or a similarity index) is determined.

To determine the cohesiveness of the predicted third type terms 430A (the predicted injury claim) and the actual third type term 430 (the actual injury claim), techniques like, for example, clustering or simple distance measures in the term vector space can be used to compute the cohesiveness of the terms or words. For example, using the set of terms from the claim narrative, and using for example the term embedding model 215, the terms are represented in the term vector space and using techniques like clustering or simple distance measurements in the term vector space the cohesiveness of the terms are computed. In an embodiment, a cohesiveness or similarity module 230 having a term cohesiveness (e.g., clustering) model 235 learns the co-occurring terms and their cohesiveness or similarity, and in an embodiment the term cohesiveness model 235 predicts other third type terms from a subset of third type terms which helps in cross checking the cohesiveness of the third type terms.

In an approach, a cohesive score or similarity score 955 can be computed, by, for example, the term cohesiveness model 235, for the set of narrative terms of the injury (e.g., the third type terms) 430 from the submitted (given) claim and the predicted injury terms 430A. In an embodiment, the cohesiveness score can be high if the actual injury (third type) terms 430 from the claim and the predicted injury (third type) terms 430A exhibit a high correlation, and the score can be low if the actual injury (third type) terms 430 (e.g., the actual injury claimed) from the claim and the predicted injury (third type) terms 430A exhibit low cohesiveness (e.g., representing a mixed injury nature).

Figure 8:
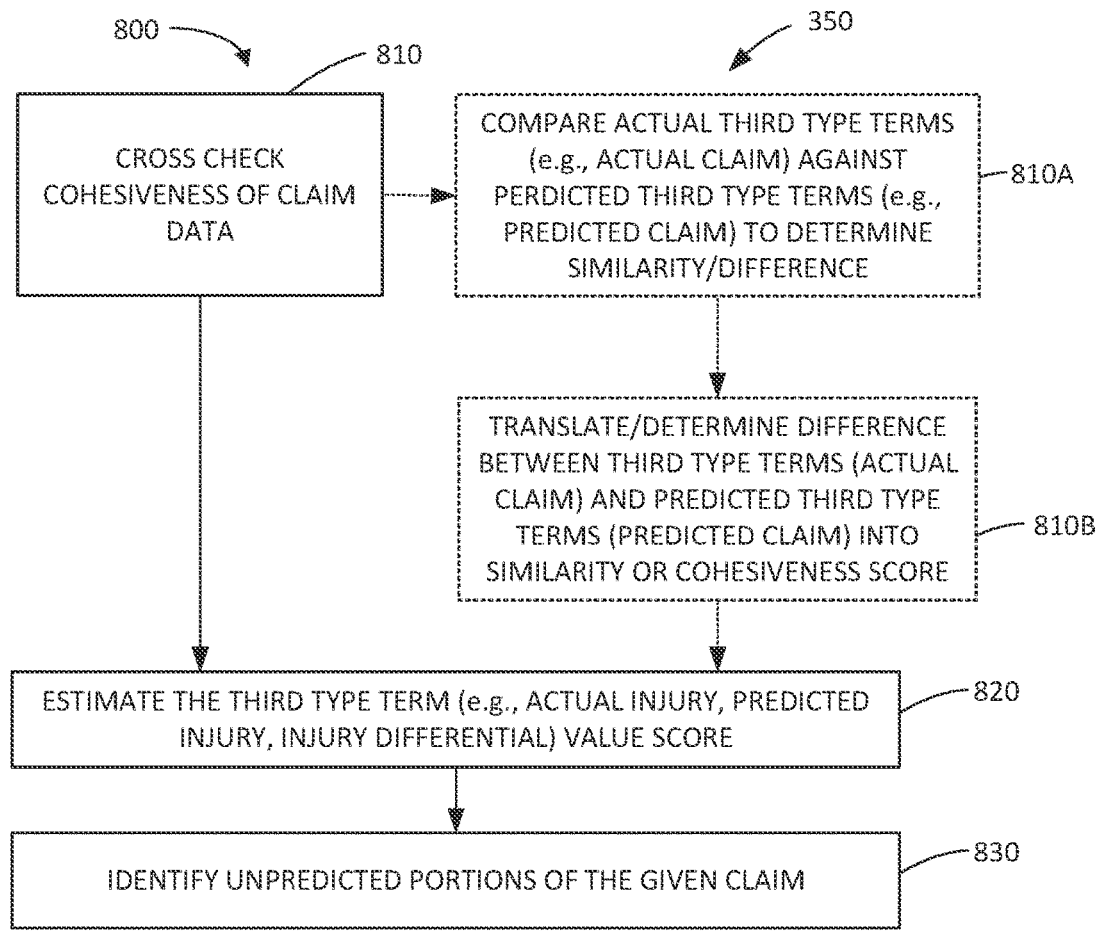
FIG. 8 is a flow chart of a method of processing, according to an embodiment of the present disclosure, determining the cohesiveness of predicted third type terms and actual third type terms and scoring the claim cost, including in an embodiment identifying unpredicted portions of the claim.

FIG. 8 is a flow chart illustrating one or more embodiments of the process of 350. FIG. 8 illustrates process 800 where a cross check, similarity check, or cohesiveness check is performed on the predicted and actual third type terms 430A, 430 to determine the cohesiveness or similarity between the two data sets (e.g., a similarity/cohesiveness score) and the claim value is determined and/or scored. In an embodiment, a cohesiveness check is performed at 810, for example by a term cohesiveness model 235, to determine the cohesiveness of the actual injury terms 430 with the predicted injury terms 430A. In an approach, the method of performing the cohesiveness check at 810 includes at 810A comparing the actual third type terms 430 (e.g., the injury terms from the actual claim) against the predicted third type terms 430A (e.g., the predicted injury terms) to determine their similarity and/or difference. For example, in the vehicle accident domain, at 810A the actual injury terms 430 extracted from the claim materials would be compared to the predicted injury terms 430A produced by the term prediction model 225 when run with the first and second type terms 410, 420 from the claim materials.

Figure 9:
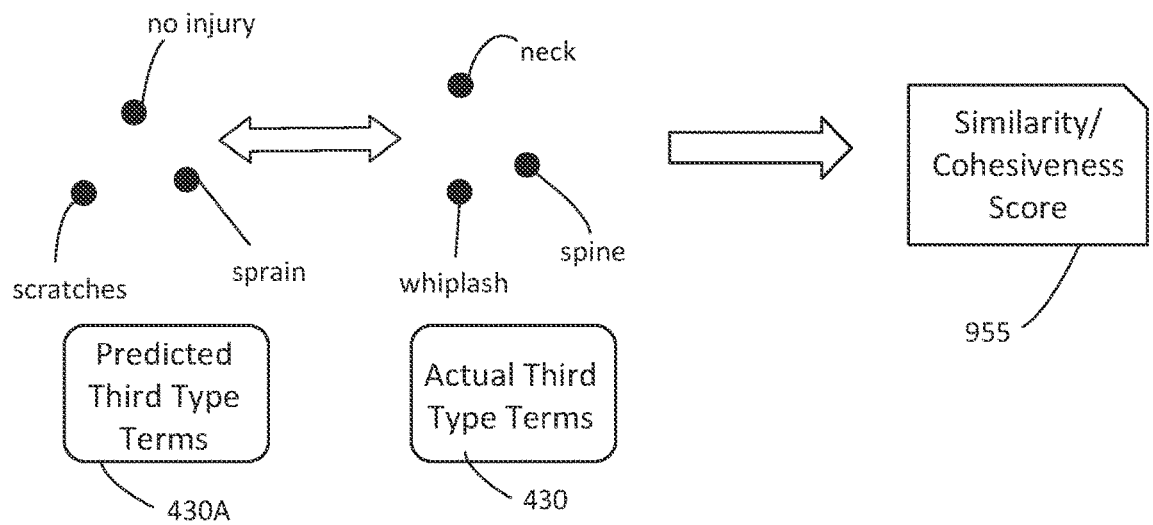
FIG. 9 shows an example diagrammatic representation of performing a claim term similarity or cohesiveness check according to an embodiment of the present disclosure.

At 810B the difference between the actual injury terms 430 and the predicted injury terms 430A would be converted or translated into a cohesiveness or similarity score 955. FIG. 9 is a diagrammatic illustration showing the comparison of the predicted third type terms 430A to the actual third type terms 430 and generating a Cohesiveness or Similarity Score 955. As indicated above, in an embodiment, the cohesiveness score 955 can be high if the actual injury (third type) terms 430 from the claim and the predicted injury (third type) terms 430A exhibit a high correlation, and the cohesiveness score 955 can be low if the actual injury (third type) terms 430 (e.g., the actual injury claimed) from the claim and the predicted injury (third type) terms 430A exhibit low cohesiveness.

Process 800 can in an embodiment further include at 820 calculating the value or cost of the differential between the actual third type (injury) term(s) (e.g., the injury terms from the actual claim) and the predicted third type (injury) term(s). For example, the difference between the actual third type terms 430 and the predicted third type terms 430A could be translated or converted into a percent exposure (e.g., there is 30% more injury claimed than expected) and/or a money value (e.g., there is X more money for the claim than expected). In an approach, at 820 a machine learning (ML) value scoring model 245 can be built and trained to learn to estimate the value or cost of the claim from the third terms (e.g., the injury terms), and in an embodiment at 820 the machine learning value scoring model 245 (also referred to as value model or value machine learning model 245) can be built and trained from a historical corpus of claims to learn to estimate the claim value, e.g., the predicted claim (injury) cost (based upon the predicted injury narrative), the actual claim (injury) cost (based upon the actual injury narrative), and the difference in cost between the predicted claim (injury) cost and the actual claim (injury) cost asserted for the given claim. In an example, embodiment, at 820 the percent excess injury claimed is determined and the money value of the percent excess injury is determined. Once the value model 245 is built and trained, the value model 245 can be run to compute one or more of the asserted claim (injury) value/cost for the given claim, the predicted claim (injury) value/cost, and/or the value/cost differential between the predicted claim (injury) value/cost and actual claim (injury) value/cost. In one or more embodiments, the value or claim score 1075 can be represented as a percent exposure or difference and/or a money figure.

Figure 10:
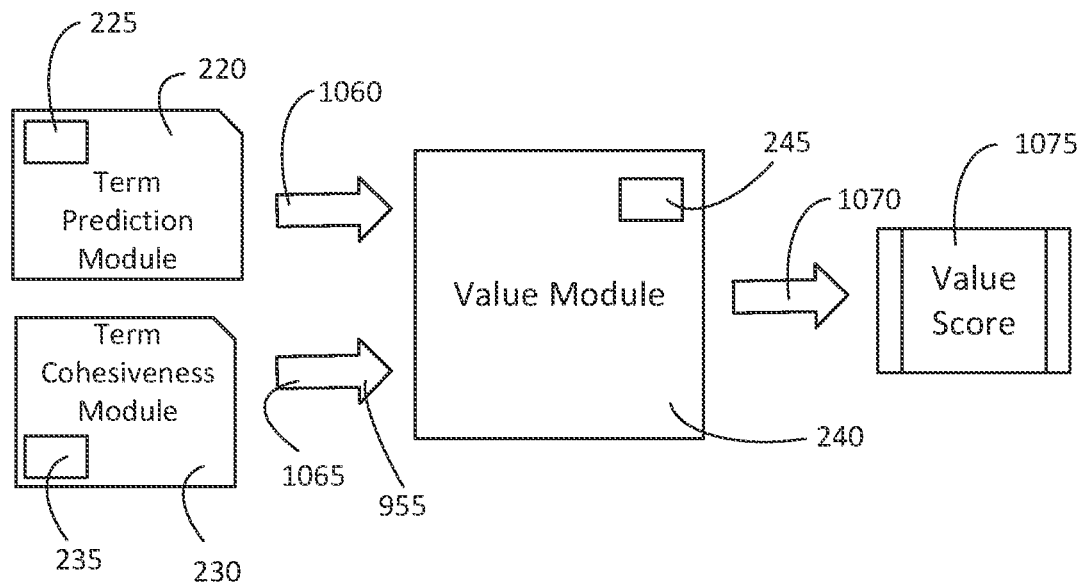
FIG. 10 is an example diagrammatic representation of a value score generation by Value Module/Model receiving input from Term Prediction Module/Model and input from Term Cohesiveness Module/Model according to an embodiment of the present disclosure.

In one or more embodiments, the value model 245 uses the output from the term prediction model 225 and the cohesiveness model 235 to learn to estimate the claim cost. The value model 245 is run using the output from the term prediction model 225 for the given claim and the cohesiveness model 235 for the given claim to estimate the claim cost for the given claim. For example, the value model 245 takes two inputs. The first input is the list of predicted injury terms from the term prediction model 225 and the second input is the list of terms that do not fit the context (the terms that are not cohesive) and a cohesiveness score. The value model 245 takes the two inputs and in an embodiment computes the percent excess injury and the money value of the excess injury claimed. FIG. 10 is a diagrammatic illustration of the value module/model 240/245 receiving input 1060 from the Term Prediction Module/Model 220/225 and similarity/cohesiveness score 955 as input 1065 from the Term Cohesiveness Module/Model 230/235 to generate output 1070 as value score 1075.

In addition, process 800 can further optionally include at 830 identifying the third type terms that were not predicted (e.g., the unexpected outlier terms) or the unpredicted portions of the claim. In the vehicle accident domain, identifying the unpredicted portions of the claim can include for example identifying the third type terms 430 in the given claim that are outliers or do not correspond with the actual incident (first type) terms 410 and the vehicle damage (second type) terms 420. For example, whiplash and spine injury can be identified as a third type (injury) terms that would not be predicted or expected where the incident/accident (first type) terms and vehicle damage (second type) terms indicate a minor parking lot bumper tap. The third term (injury) types that would not be expected from the given claim can be used to compute the percent excess injury and the money value of the excess claim.

Figure 11:
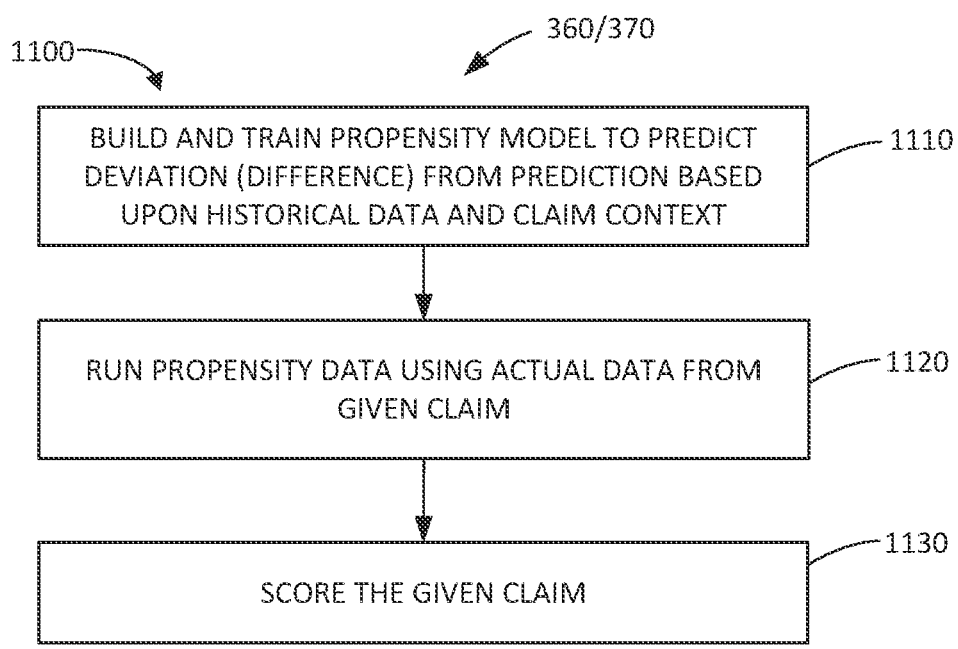
FIG. 11 is a flow chart of an embodiment of a method of building, training, and running a propensity model to predict the deviation from the predicted claim based upon historical data and claim context, and scoring the given claim, according to the present disclosure.

Process 300, in an embodiment, continues at 360 to build and train a propensity model 255 that determines whether there is outlier data or an outlier claim given the further context of the incident or claim. At 370 the propensity model 255 is run with the actual incident or claim data to determine for the actual claim whether there is outlier data (e.g., an unexpected injury claim) indicative of an erroneous claim. FIG. 11 provides a flow chart of a method 1100 according to an embodiment of building and running the propensity model 255 of steps 360 and 370. At 1110 of method 1100, the propensity model 255 is built and trained to predict deviation of or a difference between the actual third type terms 430 (e.g., the actual claim) from the predicted third type terms 430A (e.g., the predicted claim) based upon historical data and claim context.

The propensity model 255 uses the output from the value scoring analysis (e.g., the value score 1075) and uses structured metadata from the claim and other metadata regarding the context of the incident/accident and historical data to train the automated or machine learning propensity model 255 to predict the propensity that the actual claim is erroneous (e.g., excessive) in the given context. That is, a propensity model 255 is built and trained to predict outlier or erroneous claims indicative of fraud, for example, from the historical data of percent exposure difference and money value difference computed at 350/820 (e.g., the value score 1075) along with metadata from the claims or incidents.

At 1120 the propensity model 255 is run using actual data from the given claim under review. In the domain of vehicle accidents, the value score 1075 is input into the propensity model 255 along with further contextual information regarding the incident under review (e.g., the given claim) such as, for example, the number of vehicles involved, the number of people involved, the place of the accident, the time of the accident, the speed of the vehicle, and other metadata that is available to provide context on the incident or accident. Process 1100 can further optionally include at 1130 scoring the targeted or given claim under review.

Figure 12:
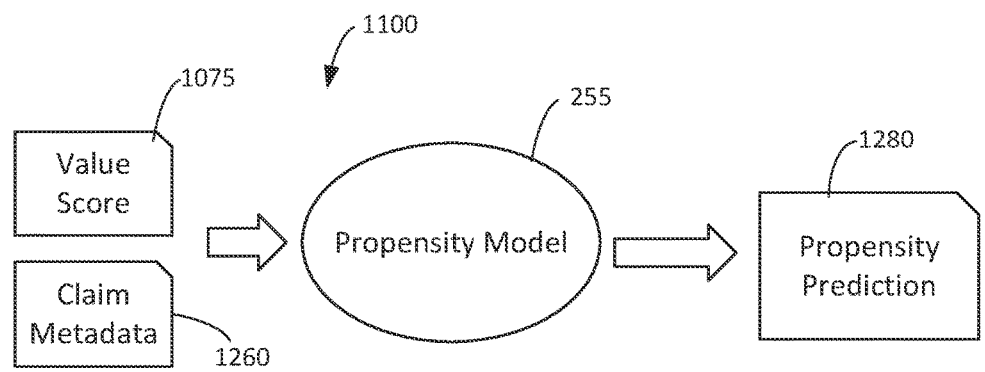
FIG. 12 is a diagrammatic representation of the process of creating, training, and running a propensity model to include historic data and context to determine whether the actual claim terms are outlier data according to an embodiment of the disclosure.

FIG. 12 is a diagrammatic illustration of the process 1100 of FIG. 11 and the process steps 360 and 370 of process 300 of FIG. 3. As illustrated in FIG. 12 the value (claim) score 1075 and the claim metadata 1260 from the targeted claim are input into the propensity model 255 to generate and output the propensity prediction 1280. For example, the value or cost score 1075 can indicate a 30% more injury claimed than projected and that similarity score 1075 can be input into the propensity model 255 with further metadata providing additional context to the incident that might demonstrate or otherwise indicate that the injury claim is justified and not an outlier given the further incident/accident context. The further context data can also fortify or support that the third term (injury) type (e.g., the given claim) is an outlier or unexpected, and indicate an erroneous claim. In an example, the propensity prediction 1280 can indicate the likelihood of an erroneous claim that can be indicative of fraud.

Figure 13:
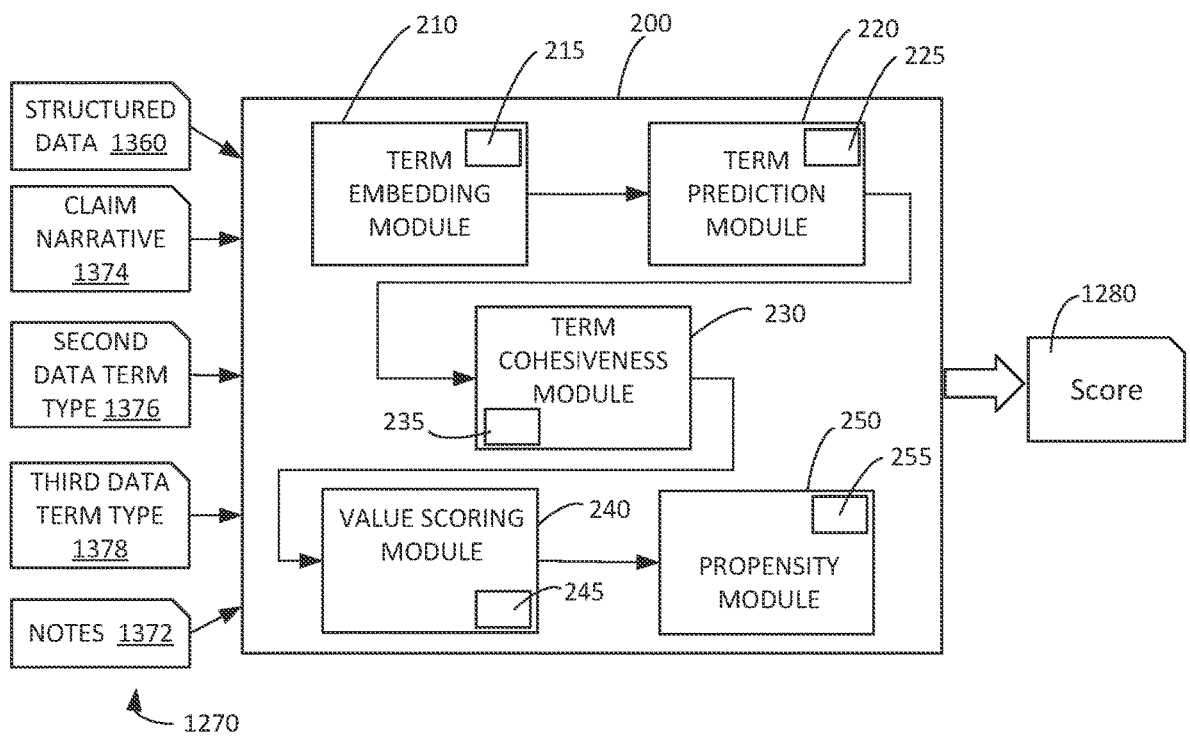
FIG. 13 shows an example diagrammatic representation of a platform containing the modules to determine outlier data using term patterns according to an embodiment of the present disclosure.

FIG. 13 illustrates the module or platform 200 (e.g., outlier prediction module) which in one or more embodiments can determine or predict outlier data (e.g., claims) that do not indicate a proper or expected correspondence with other data and terms using term patterns based upon term types. Platform 200 includes an Term Embedding Module 210 containing a machine learning term embedding model 215; Term Prediction Module 220 containing machine learning term prediction model 225; Term Cohesiveness Module 230 containing machine learning term cohesiveness model 235; Value Scoring Module 240 containing machine learning value scoring model 245; and Propensity Module 250 containing machine learning propensity model 255. It can be appreciated that the Term Embedding Module 210, Term Prediction Module 220, Term Cohesiveness Module 230, Scoring Module 240, and Propensity Module 250 provides instructions for employing logic and operating circuitry to perform their respective functions as described herein.

As shown in FIG. 13, structured data 1360, and unstructured data 1370 in the form of notes 1372, claim narrative 1374 (e.g., first term (incident) type), second data term type 1376 (e.g., vehicle damage type), and third data term type 1378 (e.g., injury type) can be input into platform or module 200. As can be appreciated, claim narrative 1374, second data term type 1376, and third data term type 1378 is likely to be obtained from multiple sources that contain mixed datatype. For example, a police report or insurance claim form is likely to contain claim narrative information 1374, second data term type 1376, and third data term type 1378. Data is input into module 200 in the form of unstructured and structured data and the modules through unsupervised and/or supervised learning process the data and output a score 1280 that indicates the likelihood of an erroneous claim that can be indicative of fraud.

While the system, platform, programming instructions, and techniques have been described in connection with the vehicle accident domain it can be appreciated that the system, platform, programming instructions, and techniques can be used in other domains. In addition, while the system, platform, programming instructions, and techniques has referred to and used finding patterns and correlations between a first type of term, a second type of term and a third type of term, it can be appreciated that the system, platform, programming instructions, and techniques can have application to more or less correlated terms. That is, for example, system, platform, programming instructions, and techniques can be used where there is a correlation between a first type of term and a second type of term, and/or can be implemented where fourth and additional type of terms are included and correlated.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 14:
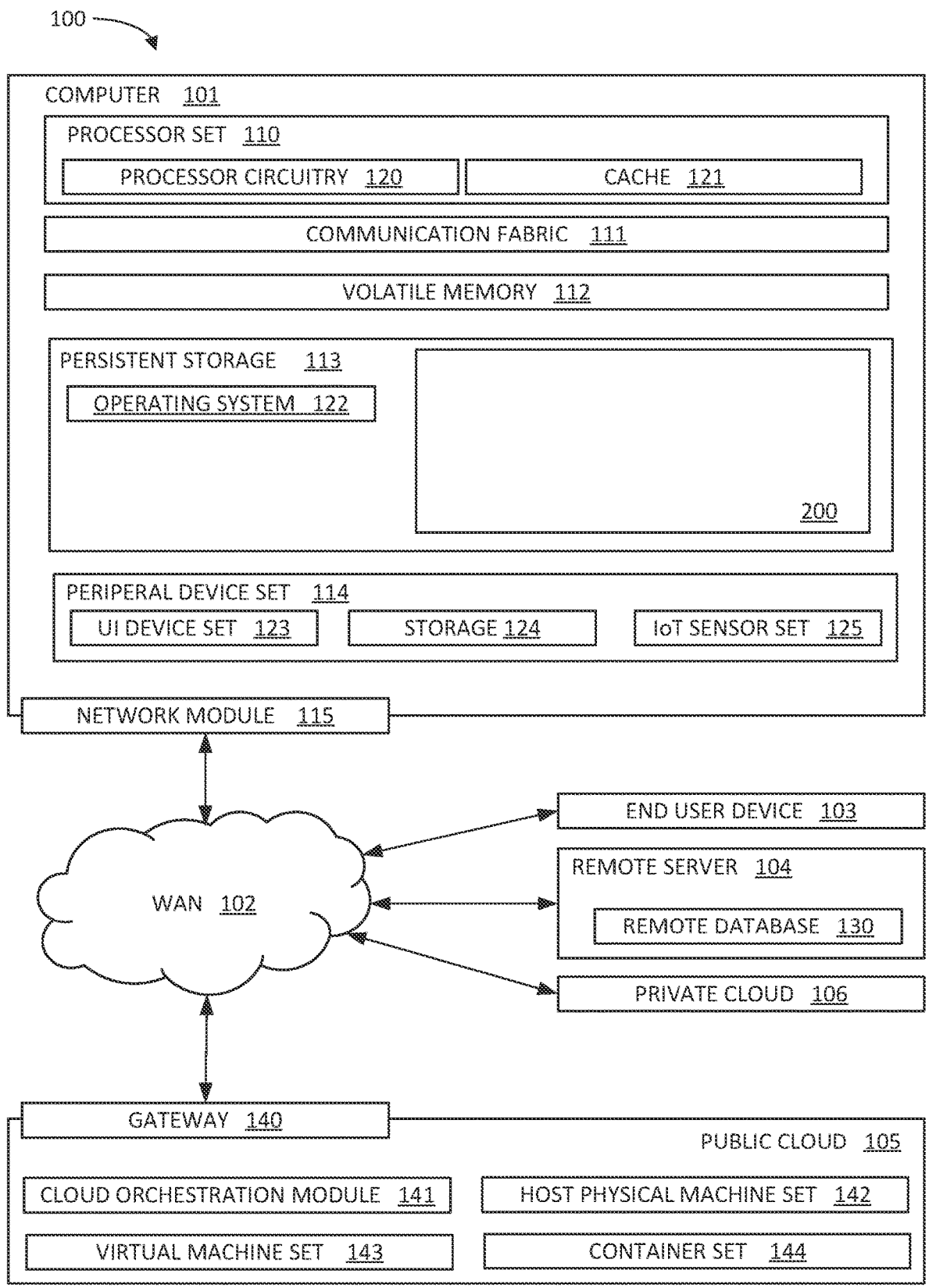
FIG. 14 depicts an example computing environment for execution of at least some of the computer code involved in performing data analytics to determine outlier data using term patterns according to an embodiment of the disclosure.

Computing environment 100 of FIG. 14 contains an example of an environment for the execution of at least some of the computer code involved in performing the inventive methods, such as determining whether there is outlier data by using term patterns, including in an example embodiment new analytics code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 14. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods. This code and its operation has been described in connection with the example outlier prediction module 200 for determining outlier data by using term patterns.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, the method comprising:
   building and training a machine learning term embedding model for a specific domain to learn the correlation between at least a first term type, a second term type and a third claim type using historical data from the specific domain;

building and training a machine learning term prediction model using the term embedding model and historical data to predict terms used in claims in the specific domain;

extracting first type terms, second type terms, and third type terms for a given claim in the specific domain;

running the term prediction model with first term types and second term types extracted from the given claim in the specific domain to obtain predicted third type terms for the given claim;

determining cohesiveness between the predicted third type terms and the third type terms extracted from the given claim in the specific domain;

determining a value score between the predicted third type terms and the third type terms extracted from the given claim in the specific domain;

building and training a machine learning propensity model using the value score and context data from historical corpus of claims to predict the likelihood that the third type terms are unexpected; and running the propensity model with the value score determined for the given claim and context data for the given claim to determine if the given claim is unexpected.

2. The method of claim 1, further comprising extracting at least one of an extraction group consisting of lexicons, key words, and combinations thereof from unstructured and structured data from documents in the specific domain to build and train the term embedding model.

3. The method of claim 2, further comprising using Natural Language Processing to extract at least one of the extraction group.

4. The method of claim 1, wherein determining the cohesiveness between the predicted third type terms extracted from the given claim comprises using at least one of a measurement group consisting of clustering techniques, distance in a term vector space, and combinations thereof.

5. The method of claim 1, wherein determining the cohesiveness between the predicted third type terms extracted from the given claim comprises predicting other third type terms from a subset of third type terms.

6. The method of claim 1, further comprising determining a cohesiveness score between the predicted third type terms and the third type terms extracted from the given claim.

7. The method of claim 6, wherein determining value score between the predicted third type terms and the third type terms extracted from the given claim comprises using the cohesiveness score and the output from the term prediction model.

8. The method of claim 1, wherein the specific domain is vehicle accidents, the first term type are terms descriptive of the vehicle accident, the second term type are terms descriptive of the vehicle damage, and the third term type are terms descriptive of the injury.

9. The method of claim 1, further comprising identifying unexpected portions of the given claim.

10. The method of claim 1, further comprising scoring the given claim.

11. A computer programing product comprising a computer readable storage medium storing instructions that, when executed by at least one hardware processor, configure the at least one hardware processor to:

build and train a machine learning term embedding model for a specific domain to learn the correlation between at least a first term type, a second term type and a third claim type using historical data from the specific domain;

build and train a machine learning term prediction model using the term embedding model and historical data to predict terms used in claims in the specific domain;

extract first type terms, second type terms, and third type terms for a given claim in the specific domain;

run the term prediction model with first term types and second term types extracted from the given claim in the specific domain to obtain predicted third type terms for the given claim;

determine cohesiveness between the predicted third type terms and the third type terms extracted from the given claim in the specific domain;

determine value score between the predicted third type terms and the third type terms extracted from the given claim in the specific domain;

build and train a machine learning propensity model using the value score and context data from historical corpus of claims to predict the likelihood that the third type terms are unexpected; and run propensity model with the value score determined for the given claim and context data for the given claim to determine if the given claim is unexpected.

12. The computer program product according to claim 11, further comprising instructions that, when executed by the at least one hardware processor, configure the at least one hardware processor to extract at least one of an extraction group consisting of lexicons, key words, and combinations thereof from unstructured and structured data from documents in the specific domain to build and train the term embedding model.

13. The computer program product according to claim 12, further comprising instructions that, when executed by the at least one hardware processor, configure the at least one hardware processor to use Natural Language Processing to extract at least one of the extraction group.

14. The computer program product according to claim 11, wherein instructions to determine the cohesiveness between the predicted third type terms extracted from the given claim comprises instructions that, when executed by the at least one hardware processor, configure the at least one hardware processor to use at least one of a measurement group consisting of clustering techniques, distance in a term vector space, and combinations thereof.

15. The computer program product according to claim 11, further comprising instructions that, when executed by the at least one hardware processor, configure the at least one hardware processor to determine a cohesiveness score between the predicted third type terms and the third type terms extracted from the given claim.

16. The computer program product according to claim 15, wherein instructions to determine a value score between the predicted third type terms and the third type terms extracted from the given claim comprises instructions that, when executed by the at least one hardware processor, configure the at least one hardware processor to use the cohesiveness score and the output from the term prediction model.

17. The computer program product according to claim 11, wherein the specific domain is vehicle accidents, the first term type are terms descriptive of the vehicle accident, the second term type are terms descriptive of the vehicle damage, and the third term type are terms descriptive of the injury.

18. A system comprising:
a processor; and
an outlier prediction module wherein the outlier prediction module configures the processor to:

build and train a machine learning term embedding model for a specific domain to learn the correlation between at least a first term type, a second term type and a third claim type using historical data from the specific domain;

build and train a machine learning term prediction model using the term embedding model and historical data to predict terms used in claims in the specific domain;

extract first type terms, second type terms, and third type terms for a given claim in the specific domain;

run the term prediction model with first term types and second term types extracted from the given claim in the specific domain to obtain predicted third type terms for the given claim;

determine cohesiveness between the predicted third type terms and the third type terms extracted from the given claim in the specific domain;

determine value score between the predicted third type terms and the third type terms extracted from the given claim in the specific domain;

build and train a machine learning propensity model using the value score and context data from historical corpus of claims to predict the likelihood that the third type terms are unexpected; and run propensity model with the value score determined for the given claim and context data for the given claim to determine if the given claim is unexpected.

19. The system of claim 18, wherein the outlier prediction module further configures the processor to extract at least one of an extraction group consisting of lexicons, key words, and combinations thereof from unstructured and structured data from documents in the specific domain to build and train the term embedding model.

20. The system of claim 19, wherein the specific domain is vehicle accidents, the first term type are terms descriptive of the vehicle accident, the second term type are terms descriptive of the vehicle damage, and the third term type are terms descriptive of the injury, and wherein configuring the processor to determine the cohesiveness between the predicted third type terms extracted from the given claim further comprises the outlier prediction module further configuring the processor to: use at least one of a measurement group consisting of clustering techniques, distance in a term vector space, and combinations thereof; and determine a cohesiveness score between the predicted third type terms and the third type terms extracted from the given claim; and wherein configuring the processor to determining value score between the predicted third type terms and the third type terms extracted from the given claim further comprises the outlier prediction module further configuring the processor to use the cohesiveness score and the output from the term prediction model.

\* \* \* \* \*